US011743411B2

(12) United States Patent
Abe et al.

(10) Patent No.: US 11,743,411 B2
(45) Date of Patent: Aug. 29, 2023

(54) INFORMATION PROCESSING APPARATUS AND COMPUTER PROGRAM PRODUCT FOR REDUCING AN IMAGE AREA OR ENLARGING A BLANK AREA OF A MANUSCRIPT SO AN ADDITIONAL IMAGE FITS IN THE BLANK AREA

(71) Applicant: FUJIFILM Business Innovation Corp., Tokyo (JP)

(72) Inventors: Akane Abe, Kanagawa (JP); Akinobu Yamaguchi, Kanagawa (JP); Junichi Shimizu, Kanagawa (JP); Fumi Kosaka, Kanagawa (JP); Shinya Nakamura, Kanagawa (JP); Jun Ando, Kanagawa (JP); Masanori Yoshizuka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 341 days.

(21) Appl. No.: 17/063,702

(22) Filed: Oct. 5, 2020

(65) Prior Publication Data
US 2021/0329143 A1 Oct. 21, 2021

(30) Foreign Application Priority Data
Apr. 17, 2020 (JP) ................. 2020-074061

(51) Int. Cl.
*H04N 1/387* (2006.01)
*H04N 1/32* (2006.01)
*H04N 1/393* (2006.01)

(52) U.S. Cl.
CPC ....... *H04N 1/3876* (2013.01); *H04N 1/32133* (2013.01); *H04N 1/393* (2013.01)

(58) Field of Classification Search
CPC ........... H04N 1/32101; H04N 1/32128; H04N 1/32133; H04N 1/387; H04N 1/3876; H04N 1/393; G06K 15/1842; G06K 15/1843; G06K 15/1889
See application file for complete search history.

(56) References Cited

U.S. PATENT DOCUMENTS

| 5,214,755 | A  | * | 5/1993  | Mason ............... G06T 11/60 |
|           |    |   |         | 715/209 |
| 6,661,933 | B1 | * | 12/2003 | Hisatomi ........... H04N 1/00708 |
|           |    |   |         | 382/209 |
| 7,652,796 | B2 | * | 1/2010  | Shiina ............... H04N 1/32133 |
|           |    |   |         | 340/572.1 |
| 8,045,209 | B2 |   | 10/2011 | Nakagama et al. |
| 8,660,357 | B2 |   | 2/2014  | Oi |
| 2011/0310403 | A1 | * | 12/2011 | Morita .................. H04N 1/393 |
|           |    |   |         | 358/1.2 |

FOREIGN PATENT DOCUMENTS

| JP | H09-274664 A | * | 10/1997 |
| JP | 2007221282   |   | 8/2007  |
| JP | 2011166403   |   | 8/2011  |

* cited by examiner

*Primary Examiner* — Scott A Rogers
(74) *Attorney, Agent, or Firm* — JCIPRNET (57) ABSTRACT

An information processing apparatus includes a processor configured to acquire a manuscript image and an additional image added to the manuscript image, and reduce an image area other than a blank area in the manuscript image so that the additional image fits in the blank area of the manuscript image.

20 Claims, 10 Drawing Sheets

INFORMATION PROCESSING APPARATUS AND COMPUTER PROGRAM PRODUCT FOR REDUCING AN IMAGE AREA OR ENLARGING A BLANK AREA OF A MANUSCRIPT SO AN ADDITIONAL IMAGE FITS IN THE BLANK AREA

CROSS-REFERENCE TO RELATED APPLICATIONS

This application is based on and claims priority under 35 USC 119 from Japanese Patent Application No. 2020-074061 filed Apr. 17, 2020.

BACKGROUND

(i) Technical Field

The present invention relates to an information processing apparatus and a non-transitory computer readable medium storing a program.

(ii) Related Art

A technique for adding an additional image to a manuscript image is known. For example, JP2007-221282A discloses a technique for detecting a blank area in a page and, in a case where an original size of a stamp image exceeds the blank area, combining the stamp image in a reduced size to fit in the blank area. JP2011-166403A discloses a technique for, in a case where a stamp image is superimposed on a scanned image and it is determined that a stamp text string cannot be read, generating a composite image in which a corrected stamp image is superimposed on the scanned image.

SUMMARY

There is a case where a manuscript image does not include a sufficient blank area for adding an additional image. In this case, there is a case where, even though only the additional image is reduced, the additional image does not fit in the blank area, and an image area of the manuscript image overlaps the additional image. In particular, as in a Controlled Unclassified Information (CUI) mark required to be displayed on paper or an electronic document to protect crucial information other than confidential information by US NIST SP800-171, the additional image, which includes a large number of texts, tends to be large in a size, and thus such a problem likely to occur.

Aspects of non-limiting embodiments of the present disclosure relate to an information processing apparatus and a non-transitory computer readable medium storing a program that prevent the image area of the manuscript image from overlapping the additional image even in a case where the manuscript image does not include the sufficient blank area for adding the additional image.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to acquire a manuscript image and an additional image added to the manuscript image, and reduce an image area other than a blank area in the manuscript image so that the additional image fits in the blank area of the manuscript image.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described with reference to the accompanying drawings. Note that, in the drawings, there is a case where dimensions and ratios differ from actual dimensions and ratios for easy understanding of the invention.

1. Configuration

Figure 1:
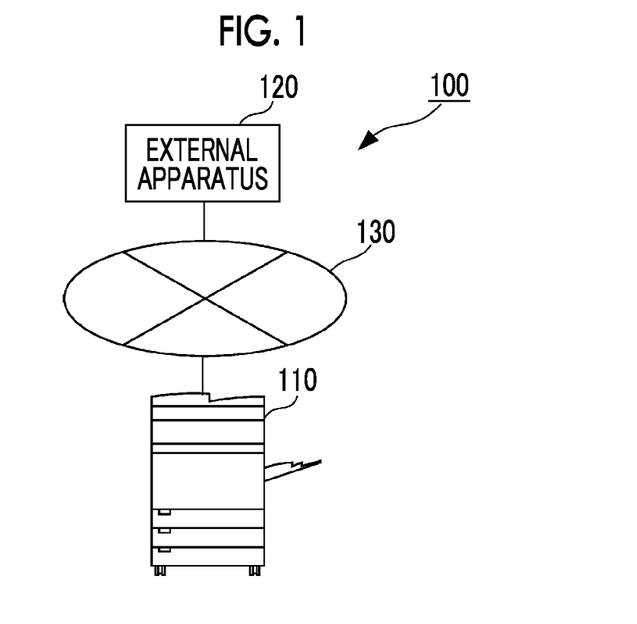
FIG. 1 is a diagram illustrating an example of a configuration of an image processing system 100 according to an exemplary embodiment.

FIG. 1 is a diagram illustrating an example of a configuration of an image processing system 100 according to an exemplary embodiment. In the United States, all suppliers concerned with US government procurement, products to be delivered, technologies, and services are required to meet conditions of NIST SP 800-171. In the conditions of NIST SP800-171, it is determined to display a CUI mark with respect to a medium containing crucial information other than confidential information. Therefore, in a case where the CUI mark is not given for a document containing the crucial information other than the confidential information in a case of creation, it is necessary to add the CUI mark thereafter. The image processing system 100 provides a service for adding an additional image, such as the CUI mark, to a manuscript such as the document. The image processing system 100 includes an image processing apparatus 110 and an external apparatus 120. The apparatuses are connected to each other via a communication line 130. The communication line 130 includes, for example, the Internet or a local area network.

Figure 2:
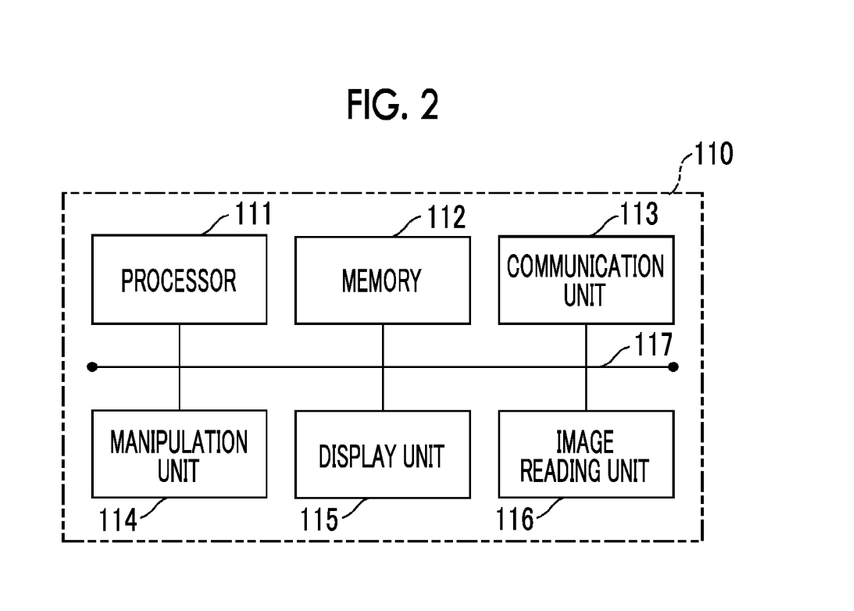
FIG. 2 is a diagram illustrating an example of a configuration of an image processing apparatus 110.

FIG. 2 is a diagram illustrating an example of a configuration of the image processing apparatus 110. The image processing apparatus 110 has a scan function, and reads the manuscript to acquire a manuscript image. In addition, the image processing apparatus 110 has a function of adding the additional image to the manuscript image. The additional image includes the CUI mark described above. Here, in many cases, the CUI mark includes information on a category and a disclosure range in addition to predetermined text strings such as "CUI" and "CONTROLLED". In this case, since the text strings become long, the CUI mark becomes large and does not fit in a blank of the manuscript image. Therefore, in the exemplary embodiment, at least any of the manuscript image or the additional image is reduced before the additional image is added to the manuscript image so that content of the manuscript image does not overlap the additional image even in such a case. The image processing apparatus 110 is an example of an information processing apparatus according to the exemplary embodiment of the invention. The image processing apparatus 110 includes a processor 111, a memory 112, a communication unit 113, a manipulation unit 114, a display unit 115, and an image reading unit 116. The units are connected via a bus 117.

The processor 111 executes a program stored in the memory 112 to control each of the units of the image processing apparatus 110 and to perform a process for realizing the functions of the image processing apparatus 110. As the processor 111, for example, a Central Processing Unit (CPU) is used. The memory 112 stores a program for realizing the functions of the image processing apparatus 110. As the memory 112, for example, a Read Only Memory (ROM) and a Random Access Memory (RAM) are used. In addition, as the memory 112, for example, a hard disk drive or a Solid State Drive (SSD) may be used, in addition to the ROM and the RAM. A communication unit 113 is connected to the communication line 130. The communication unit 113 performs data communication with the external apparatus 120 via the communication line 130. The manipulation unit 114 is used to manipulate the image processing apparatus 110. As the manipulation unit 114, for example, a touch panel and buttons are used. The display unit 115 displays various screens used to exchange information with a user. As the display unit 115, for example, a liquid crystal display is used. The image reading unit 116 reads the images and converts the images into digital signals. As the image reading unit 116, for example, an image scanner is used.

Returning to FIG. 1, the external apparatus 120 becomes an output destination of the manuscript image to which the additional image is added. As the external apparatus 120, for example, a user terminal device, a cloud server device, a printer device, or an external system is used.

2. Operation

In the following description, a case where the processor 111 is described as a subject of processing indicates that the processor 111 performs an arithmetic operation through cooperation of the program stored in the memory 112 and the processor 111 executing the program, or the process is performed by controlling an operation of other hardware elements.

2.1 Initial Settings

Figure 3:
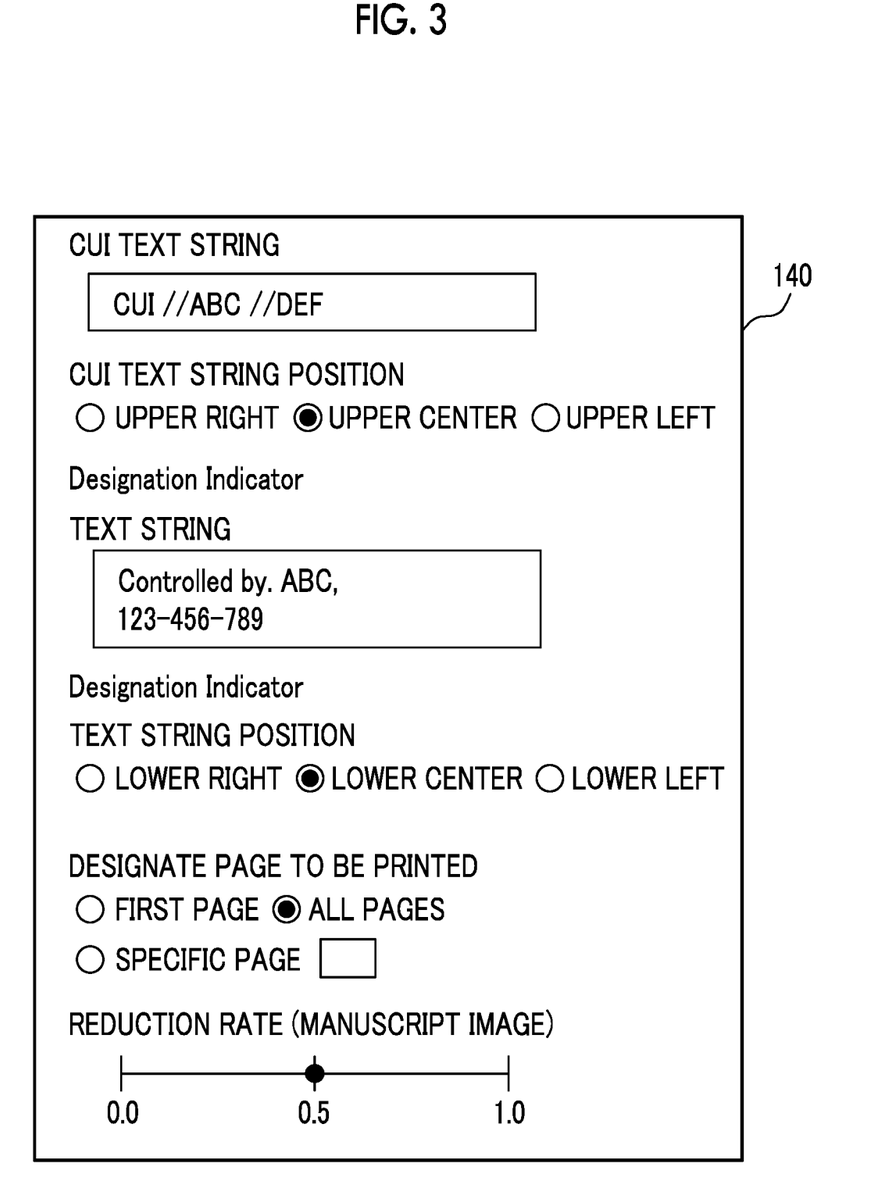
FIG. 3 is a diagram illustrating an example of a setting screen 140 displayed in a case of initial setting.

Before using the function of the image processing apparatus 110 for adding the additional image to the manuscript image, the user performs initial setting of the function. FIG. 3 is a diagram illustrating an example of a setting screen 140 displayed on the display unit 115 of the image processing apparatus 110 in a case of the initial setting. Here, it is assumed that the additional image is the CUI mark. In the initial setting, the setting screen 140 receives a manipulation of setting content and a position of the CUI mark, a page to which the CUI mark is added, and a reduction rate of the manuscript image. The content set on the setting screen 140 is stored in the memory 112 as additional image information.

The content of the CUI mark includes, for example, a text string included in the CUI mark. For example, in a case where the CUI mark is configured with a text string "CUI// ABC//DEF", the text string is set as the content of the CUI mark. In addition, in a case where the CUI mark is displayed at an upper center of the page, a position of the upper center is set. In the display of the CUI mark, there is a case where issuing source information (Designation Indicator) of the document is displayed, in addition to the CUI mark. In this case, content and a position of the issuing source information of the document are also set. For example, in a case where the issuing source information of the document is configured with a text string "Controlled by. ABC, 123-456-789", the text string is set as the content of the issuing source information of the document. In addition, in a case where the issuing source information of the document is displayed at a lower center of the page, a position of the lower center is set.

The page, to which the CUI mark is added, indicates a page to which the CUI mark is given among pages included in the manuscript image. For example, in a case where the CUI mark is added to only a first page, the first page is set as the page to which the CUI mark is added. In a case where the CUI mark is given to all pages, all pages are set as the page to which the CUI mark is added. In a case where the CUI mark is added to a specific page, the specific page is set as the page to which the CUI mark is added. In this case, the specific page is designated.

The reduction rate of the manuscript image indicates a ratio of a part of an overlapping area occupied by the reduced manuscript image to an overlapping area between the manuscript image and the CUI mark. Note that, the ratio of the part of the overlapping area occupied by the reduced CUI mark to the overlapping area between the manuscript image and the CUI mark is a value obtained by subtracting the reduction rate of the manuscript image from 1. The larger the reduction rate of the manuscript image, the larger the reduced manuscript image, and, on the contrary, the smaller the reduced CUI mark. On the other hand, the smaller the reduction rate of the manuscript image, the smaller the reduced manuscript image, and, on the contrary, the larger the reduced CUI mark.

2.2 Addition of Additional Image

Figure 4:
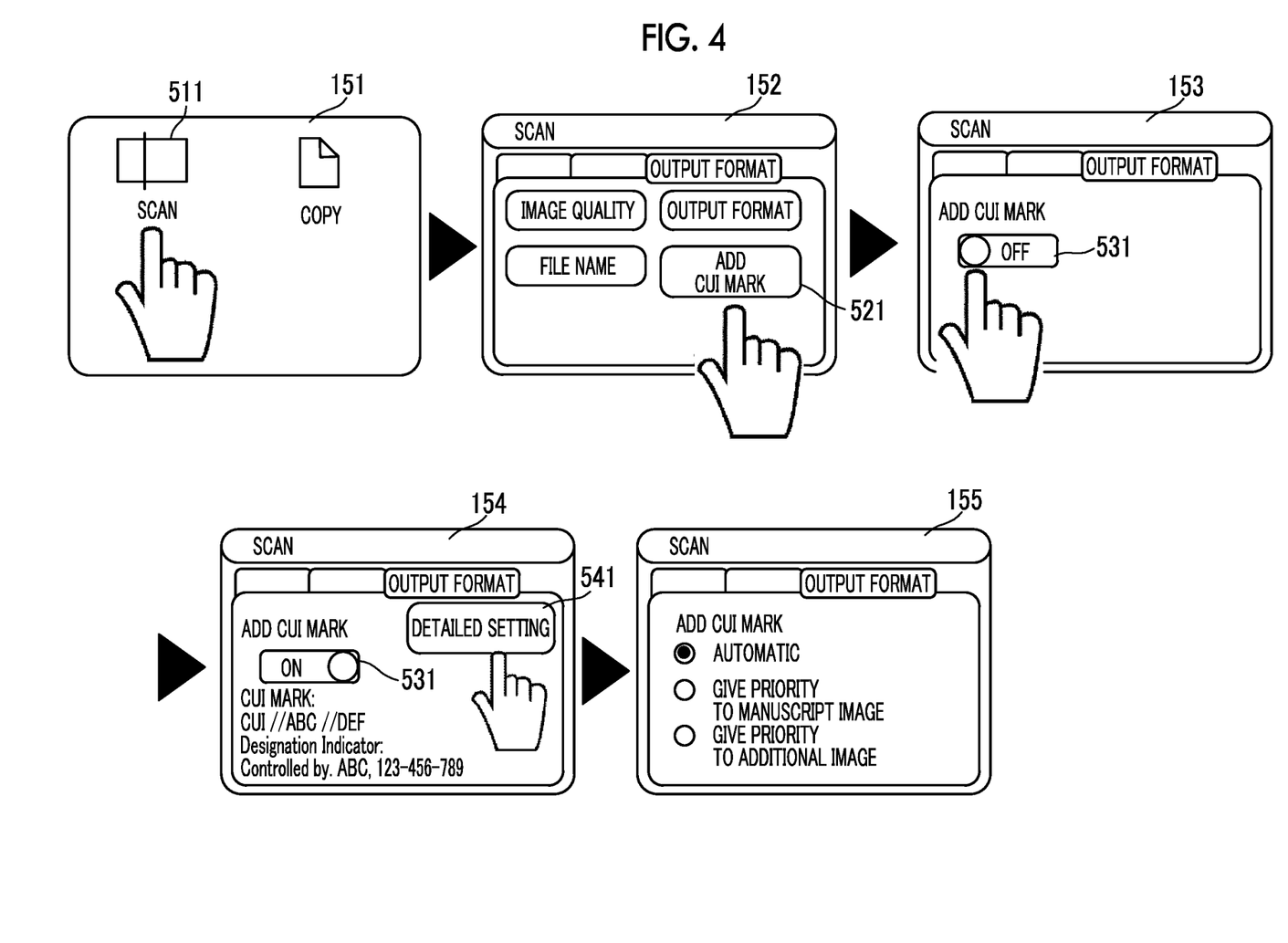
FIG. 4 is a diagram illustrating an example of screen transitions displayed on the image processing apparatus 110.

In a case where the additional image is added to the manuscript image, the user uses the manipulation unit 114 to perform a manipulation of instructing to add the additional image. FIG. 4 is a diagram illustrating an example of screen transitions displayed on the display unit 115 of the image processing apparatus 110 at this time. As illustrated in FIG. 4, first, a menu screen 151 is displayed on the display unit 115. The menu screen 151 receives a manipulation of selecting the functions of the image processing apparatus 110. The menu screen 151 includes a scan button 511 that receives a manipulation of selecting the scan function. In a case where a manipulation of pressing the scan button 511 is performed on the menu screen 151, a setting screen 152 is displayed.

The setting screen 152 receives a manipulation of setting the scan function. The setting screen 152 includes an addition button 521 that receives a manipulation of instructing to add the CUI mark. In a case where a manipulation of pressing the addition button 521 is performed on the setting screen 152, a setting screen 153 is displayed. The setting screen 153 includes a switch button 531 that receives a manipulation of selecting whether to enable or disable the addition of the CUI mark. In a case where the manipulation of enabling the addition of the CUI mark is performed using the switch button 531, the setting screen 154 is displayed.

On the setting screen 154, the content of the CUI mark set in the initial setting is displayed. In addition, in a case where the content of the issuing source information of the document is set in the initial setting, the content of the issuing source information of the document is also displayed on the setting screen 154. The setting screen 154 includes a detailed setting button 541. The detailed setting button 541 receives a manipulation of instructing to display a detailed setting screen 155. In a case where a manipulation of pressing the detailed setting button 541 is performed on the setting screen 154, the detailed setting screen 155 is displayed.

The detailed setting screen 155 receives a manipulation of selecting a reduction mode. The reduction mode includes "automatic", "manuscript image priority", and "additional image priority". In the reduction mode of "automatic", both the manuscript image and the additional image are reduced. In the reduction mode of "manuscript image priority", the manuscript image is not reduced, and only the additional image is reduced. In the reduction mode of "additional image priority", the additional image is not reduced and only the manuscript image is reduced. Here, it is assumed that the reduction mode of "automatic" is selected.

Figure 5:
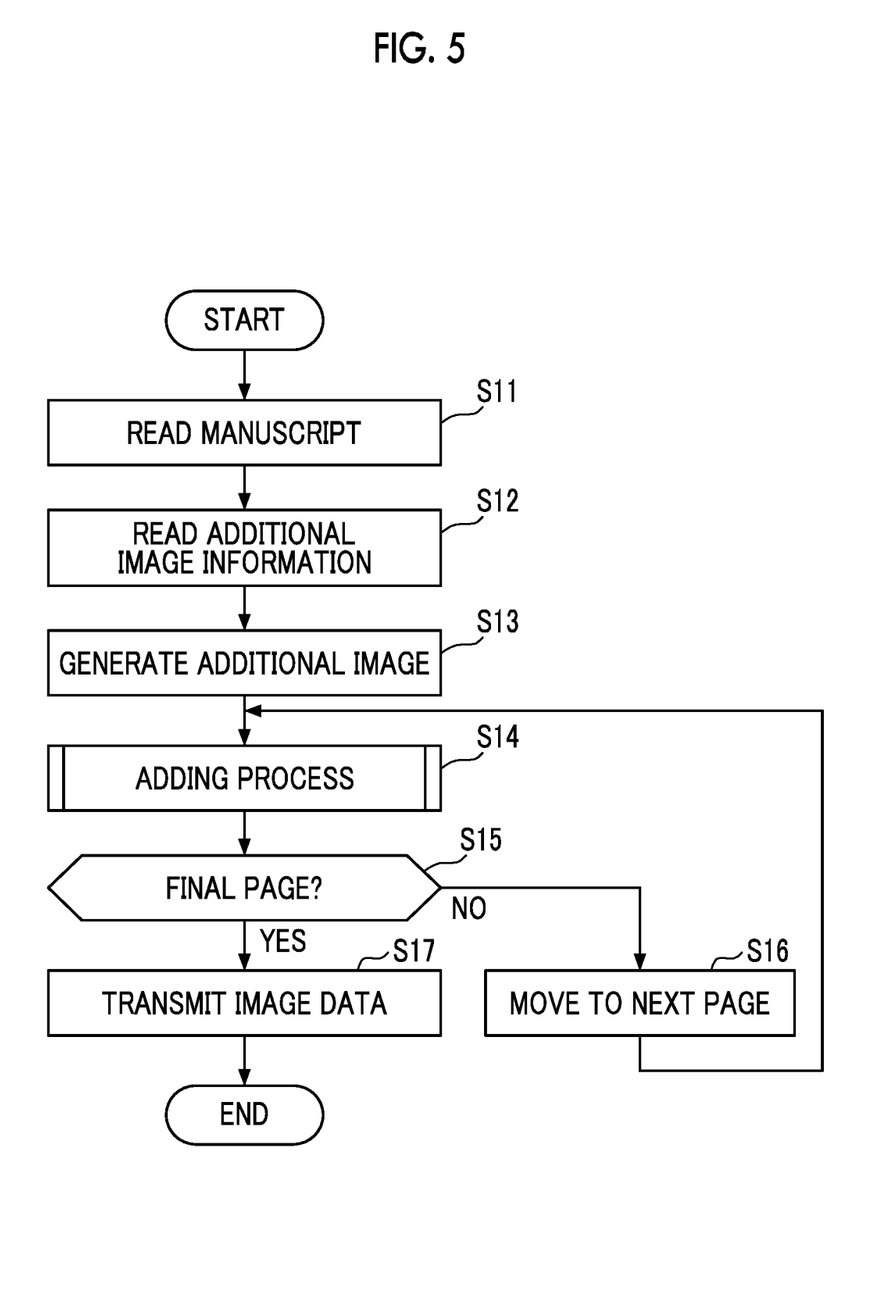
FIG. 5 is a flowchart illustrating an example of a process for generating a manuscript image, to which an additional image is attached, from a manuscript.

FIG. 5 is a flowchart illustrating an example of a process for generating the manuscript image, to which the additional image is attached, from the manuscript. For example, as illustrated in FIG. 4, the process is started with the manipulation of instructing to start the process using the manipulation unit 114, after the user performs the manipulation of instructing to add the additional image. In step S11, the processor 111 of the image processing apparatus 110 causes the image reading unit 116 to read the manuscript. As a result, the manuscript image indicating the manuscript is acquired. This manuscript may be a document, a figure, or a photograph. In addition, the manuscript image may include a plurality of pages.

In step S12, the processor 111 reads the additional image information from the memory 112. In step S13, the processor 111 generates the additional image based on the additional image information. In the example illustrated in FIG. 3, the CUI mark configured by the text string "CUI//ABC//DEF" and the issuing source information of the document configured by a text string "Controlled by. ABC, 123-456-789" are generated. As a result, the additional image added to the manuscript image is acquired. In step S14, the processor 111 performs an additional image adding process to the manuscript image acquired in step S11.

Figure 6:
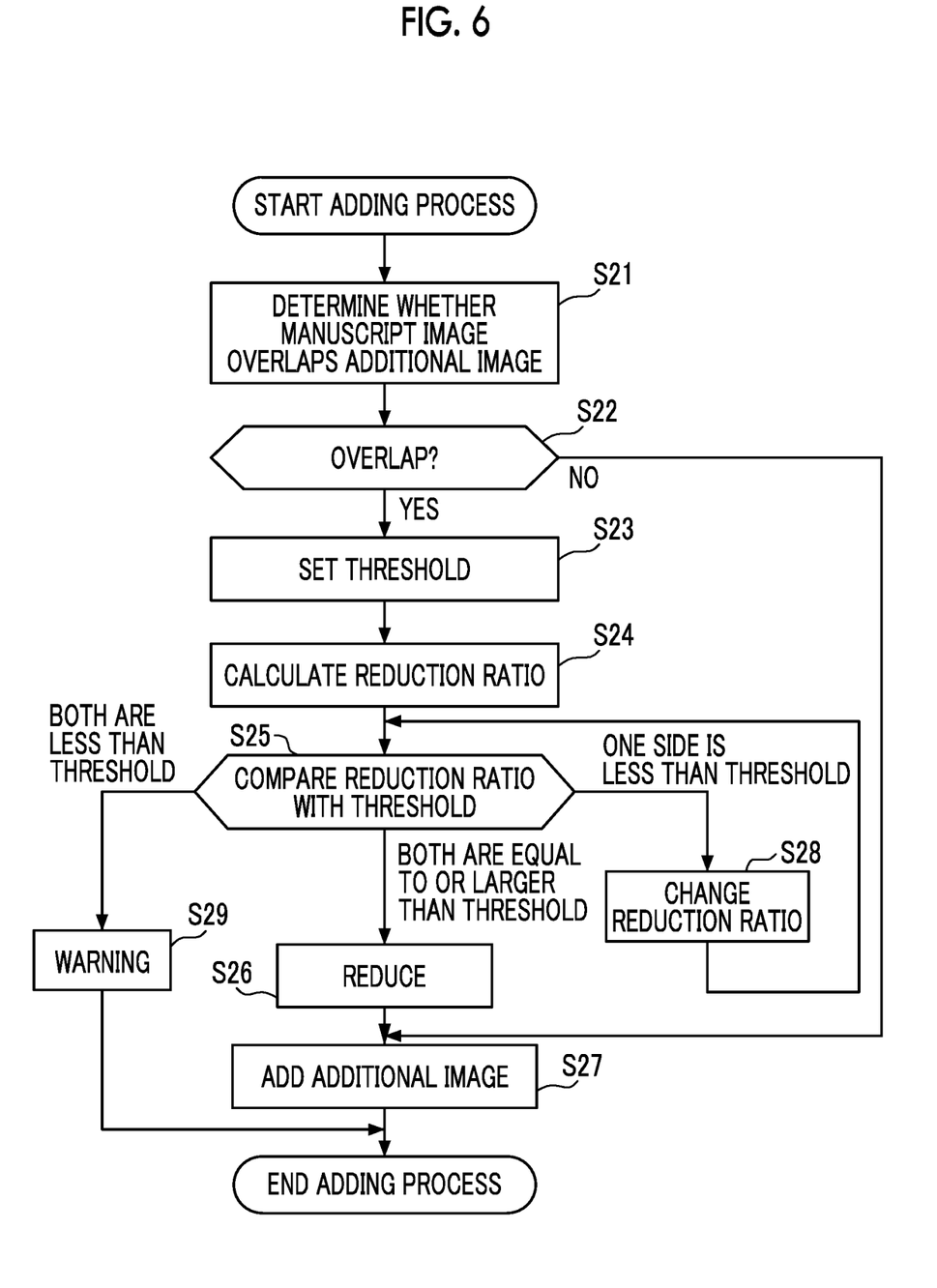
FIG. 6 is a flowchart illustrating an example of an additional image adding process.

FIG. 6 is a flowchart illustrating an example of the additional image adding process. In step S21, the processor 111 determines an overlap between an image area of the manuscript image and the additional image in a case where the additional image is disposed at a set position on the manuscript image. The image area is an area where the content of the manuscript image exists and is an area other than a blank area of the manuscript image. In a case where the additional image is disposed at the set position on the manuscript image and the additional image fits in the blank area of the manuscript image, the image area of the manuscript image does not overlap the additional image. On the other hand, in a case where the additional image is disposed at the set position on the manuscript image and the additional image does not fit in the blank area of the manuscript image, the image area of the manuscript image overlaps the additional image. In particular, in a case where the additional image is larger than the blank area of the manuscript image, the additional image does not fit in the blank area, so that the image area of the manuscript image overlaps the additional image.

Specifically, a binarization process is performed on the manuscript image, and off-pixels are detected as the blank. At this time, a process for changing a threshold in a case where the binarization is performed may be performed according to the features of the manuscript, for example, a paper quality and a color. Subsequently, a logical product of the manuscript image obtained after the binarization and on-pixels of the additional image, and pixels each having an output of 1 are detected as overlapping pixels. In a case where the overlapping pixels are detected, it is determined that the image area of the manuscript image overlaps the additional image. On the other hand, in a case where the overlapping pixels are not detected, it is determined that the image area of the manuscript image does not overlap the additional image.

In step S22, in a case where it is determined that the image area of the manuscript image does not overlap the additional image in step S21 (determination in step S22 is NO), the processor 111 proceeds to step S27. On the other hand, in a case where it is determined that the image area of the manuscript image overlaps the additional image (determination in step S22 is YES) in step S21, the processor 111 proceeds to step S23.

In step S23, the processor 111 sets a threshold of the reduction ratio of the manuscript image and a threshold of the reduction ratio of the additional image. Here, the "reduction ratio of the manuscript image" strictly refers to a reduction ratio of the image area of the manuscript image. The threshold is set according to, for example, a reduction ratio at which a size of the text included in the reduced manuscript image or the additional image is equal to or larger than a predetermined size. In this case, before the threshold is set, a text recognition process is performed by Optical text Recognition (OCR) on the manuscript image acquired in step S11, and a font size of the text included in the manuscript image is specified. For example, in a case where a minimum font size of text included in the manuscript image is 10 points and the reduction ratio, at which the font size of the text becomes 8 points of a reference in a case where the manuscript image is reduced, is 80%, the threshold of the reduction ratio of the manuscript image is 80%. The font size of the reference indicates a predetermined text size. The font size of the text included in the additional image is set in advance according to, for example, the manipulation of the user. For example, in a case where a minimum font size of text included in the additional image is 18 points and the reduction ratio, at which the font size of the text becomes 8 points of the reference in a case where the manuscript image is reduced, is 45%, the threshold of the reduction ratio of the additional image is 45%.

In step S24, the processor 111 calculates the reduction ratio of the manuscript image and the reduction ratio of the additional image. The reduction ratio refers to a rate of a reduced size to an unreduced original size. The reduction ratios are calculated as a value which causes the reduced additional image to fit in the blank area of the reduced manuscript image.

Figure 7:
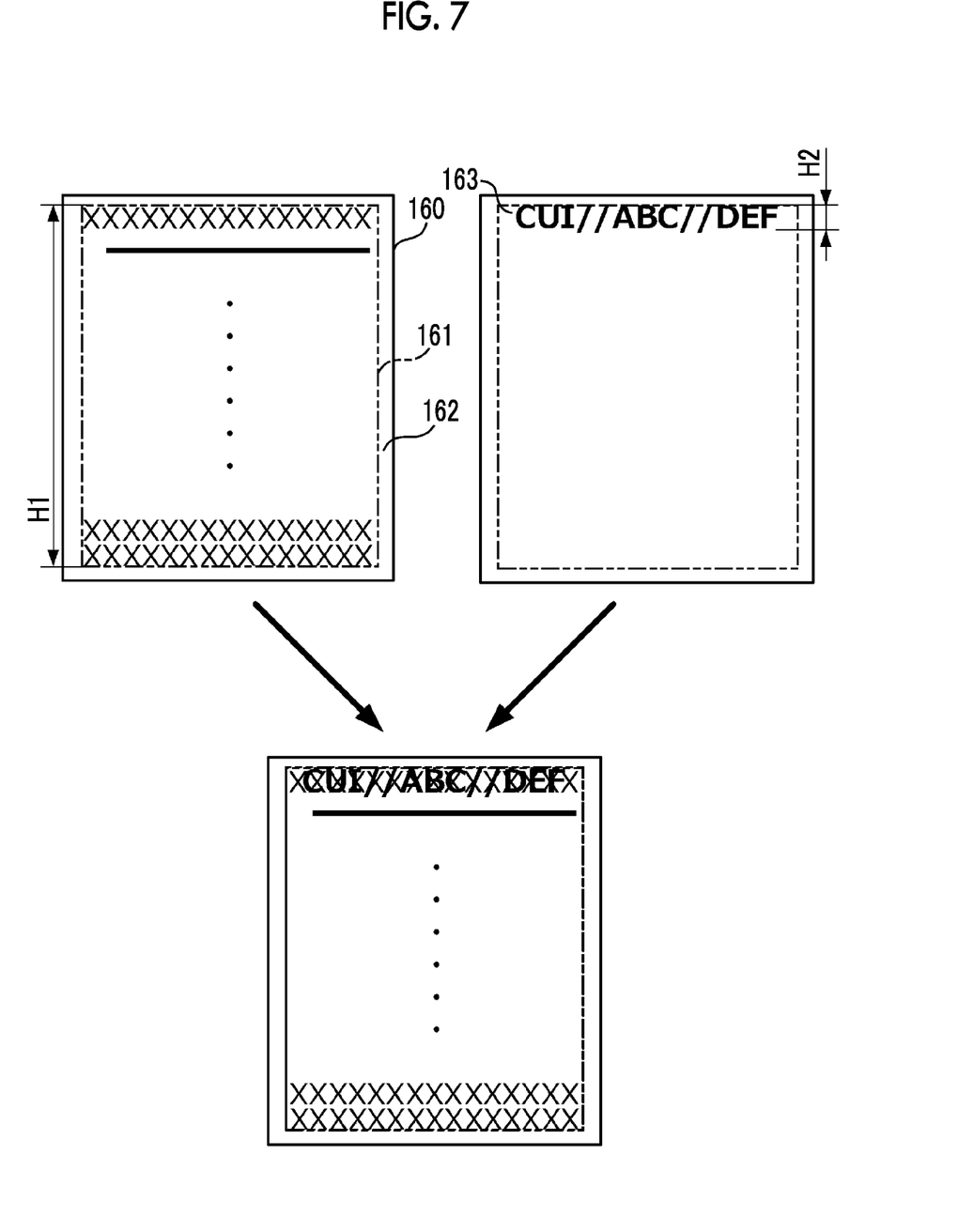
FIG. 7 is a diagram explaining an example of a method for calculating a reduction ratio in a case where one additional image is added.
Figure 8:
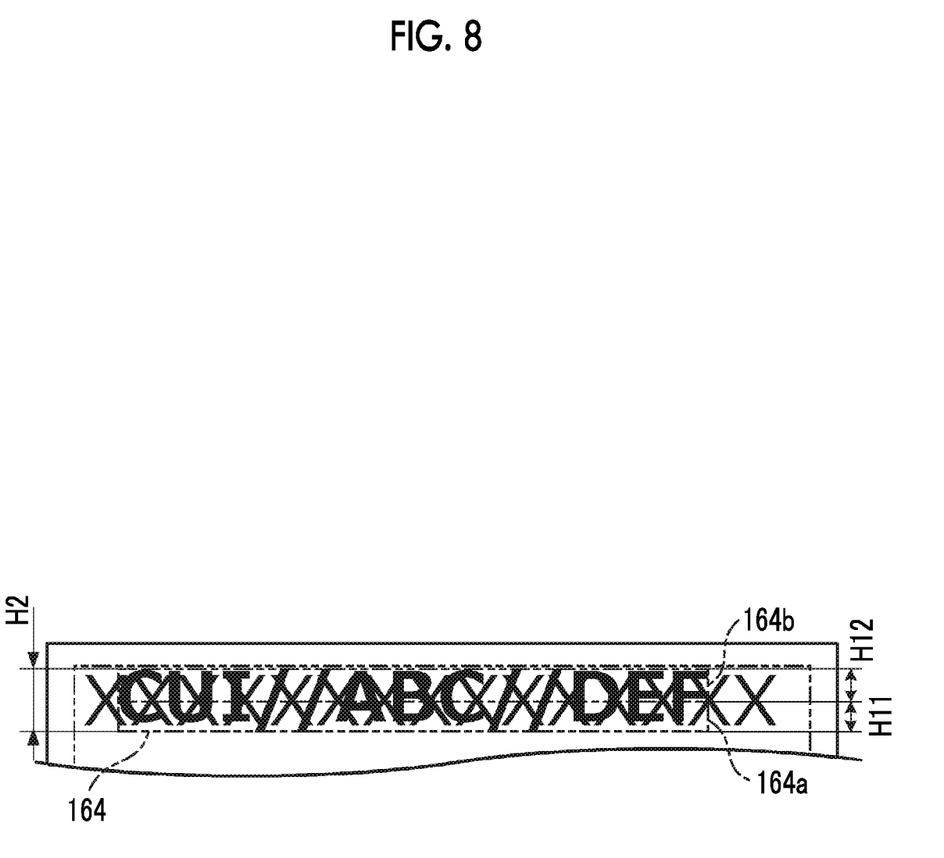
FIG. 8 is a diagram explaining an example of the method for calculating the reduction ratio in a case where one additional image is added.

FIGS. 7 and 8 are diagrams explaining examples of a method for calculating the reduction ratio in a case where one additional image is added. Note that, in the following description, a length in a vertical direction is referred to as a height, and a length in a horizontal direction is referred to as a width in FIGS. 7 and 8. As illustrated in FIG. 7, a manuscript image 160 includes an image area 161 and a blank area 162. The blank area 162 is, for example, an area in which the off-pixels described above exist in the manuscript image 160. In the example, the blank area 162 exists at right/left and top/bottom ends of the manuscript image 160. The image area 161 is an area other than the blank area 162 in the manuscript image 160. The image area 161 has a height H1. A CUI mark 163 configured by the text string "CUI//ABC//DEF" is disposed at an upper center of the manuscript image 160. The CUI mark 163 has a height H2. As illustrated in FIG. 7, the CUI mark 163 overlaps a part of the image area 161.

In this case, first, as illustrated in FIG. 8, an overlapping area 164 between the CUI mark 163 and the image area 161 is extracted from the manuscript image 160. For example, an area surrounding the above-described overlapping pixels is extracted as the overlapping area 164. The overlapping area 164 has an identical height H2 as the CUI mark 163. Subsequently, a height H11 of a partial area 164*a* and a height H12 of a partial area 164*b*, which are obtained by performing division on the overlapping area 164 in the horizontal direction in the drawing according to the reduction rate of the manuscript image indicated by the additional image information, are is calculated. The reduction rate of the manuscript image indicates a ratio of the partial area 164*a* to the partial area 164*b*. In a case where the reduction rate of the manuscript image is 0.5, the overlapping area 164 is equally divided into the partial area 164*a* and the partial area 164*b*. The partial area 164*a* is an example of a first partial area according to the exemplary embodiment of the invention. The partial area 164*b* is an example of a second partial area according to the exemplary embodiment of the invention.

The height H11 is represented by the following Equation (1).

[Equation 1]

$$\text{height } H11 = \text{height } H2 \times \text{reduction rate of manuscript image} \quad (1)$$

For example, in a case where the height H2 is 2 cm and the reduction rate of the manuscript image is 0.5, the height H11 is 2 cm×0.5=1 cm.

The height H12 is represented by the following Equation (2).

[Equation 2]

$$\text{height } H12 = \text{height } H2 \times (1 - \text{reduction rate of manuscript image}) \quad (2)$$

For example, in a case where the height H2 is 2 cm and the reduction rate of the manuscript image is 0.5, the height H12 is 2 cm×(1−0.5)=1 cm.

Subsequently, a reduction ratio R1 of the image area 161 is calculated so that a size of the reduced image area 161 becomes a size excluding the partial area 164*b*. For example, the reduction ratio R1 of the image area 161 is represented by the following Equation (3).

[Equation 3]

$$\text{reduction ratio } R1 = (\text{height } H1 - \text{height } H12)/\text{height } H1 \quad (3)$$

For example, in a case where the height H1 is 100 cm and the height H12 is 1 cm, the reduction ratio R1 is (100−1)/100=0.99.

In addition, the reduction ratio R2 of the CUI mark 163 is calculated so that the size of the reduced CUI mark 163 becomes a size excluding the partial area 164*a*. For example, the reduction ratio R2 of the CUI mark 163 is represented by the following Equation (4).

[Equation 4]

$$\text{reduction ratio } R2 = (\text{height } H2 - \text{height } H11)/\text{height } H2 \quad (4)$$

For example, in a case where the height H2 is 2 cm and the height H11 is 1 cm, the reduction ratio R2 is (2−1)/2=0.5.

Figure 9:
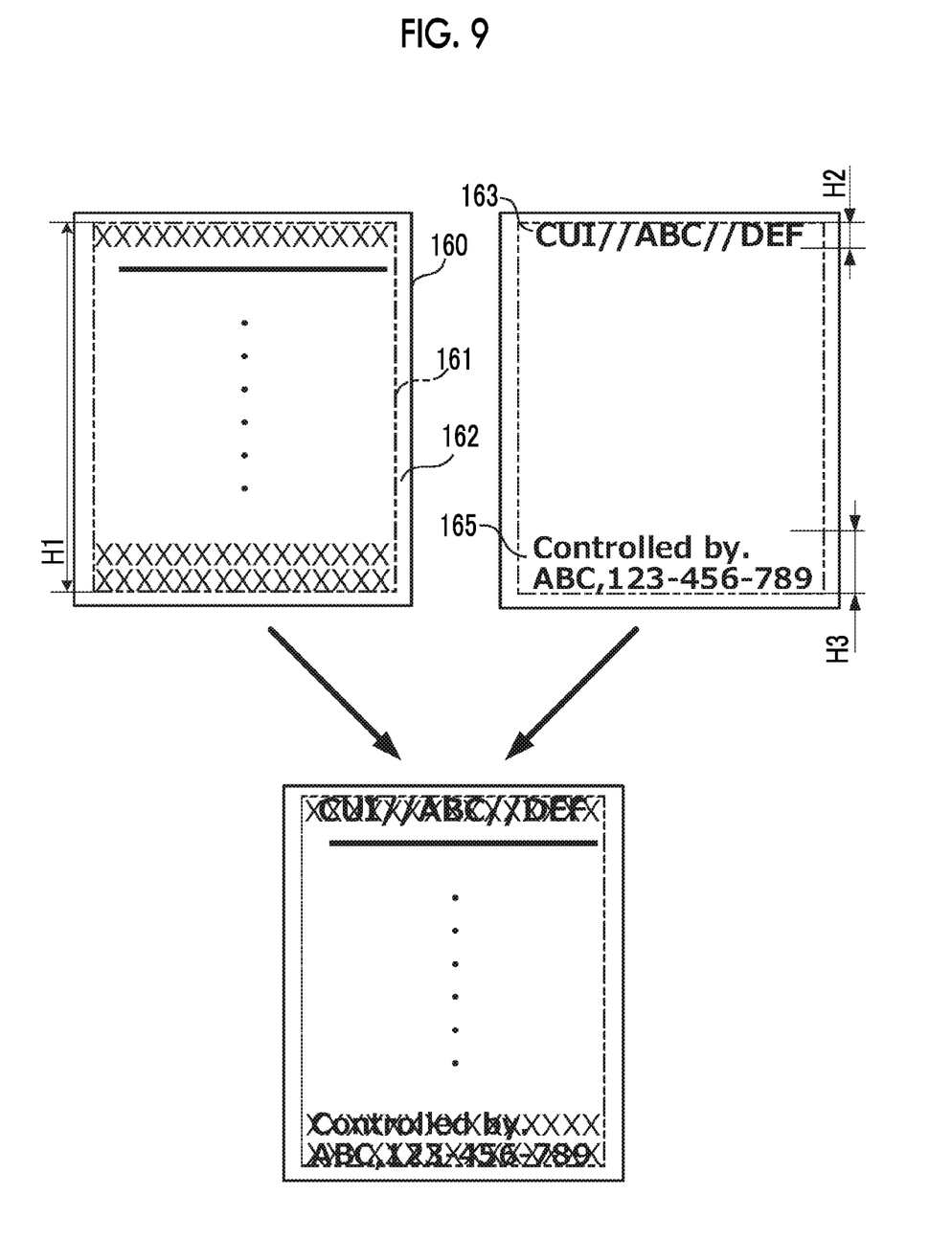
FIG. 9 is a diagram explaining an example of the method for calculating the reduction ratio in a case where two additional images are added.
Figure 10:
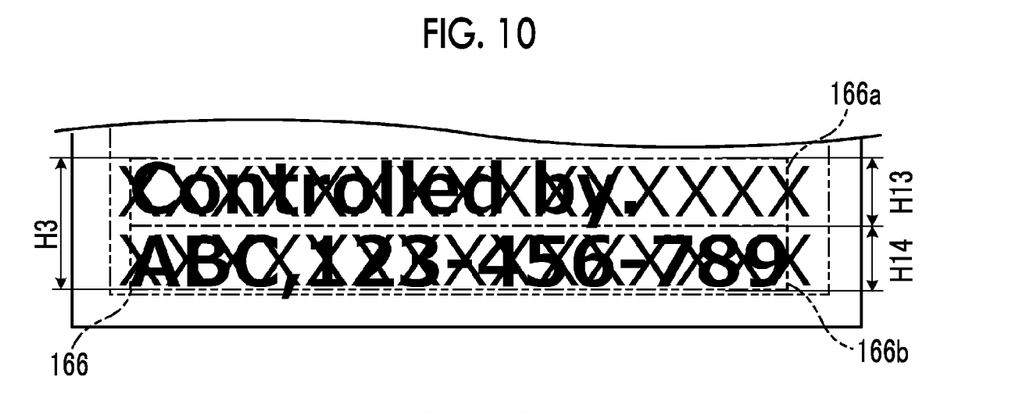
FIG. 10 is a diagram explaining an example of the method for calculating the reduction ratio in a case where two additional images are added.

FIGS. 9 and 10 are diagrams explaining examples of a method for calculating the reduction ratio in a case where two additional images are added. Note that, in the following description, a length in a vertical direction is referred to as a height, and a length in a horizontal direction is referred to as a width in FIGS. 9 and 10. As illustrated in FIG. 9, the manuscript image 160 includes the image area 161 and the blank area 162, similar to the manuscript image 160 as illustrated in FIG. 7. In addition, similar to the example illustrated in FIG. 7, the CUI mark 163 including the text string "CUI//ABC//DEF" is disposed at the upper center of the manuscript image 160, and the CUI mark 163 overlaps the part of the image area 161. Since a method for calculating the reduction ratio R2 of the CUI mark 163 is similar to the examples illustrated in FIGS. 7 and 8, description thereof will not be repeated. On the other hand, in the example illustrated in FIGS. 9 and 10, issuing source information 165 of a document, which is configured by a text string "Controlled by. ABC, 123-456-789", is disposed at a lower center of the manuscript image 160. The issuing source information 165 of the document has a height H3. As illustrated in FIG. 9, the issuing source information 165 of the document overlaps the part of the image area 161.

In this case, first, as illustrated in FIG. 10, an overlapping area 166 between the issuing source information 165 of the document and the image area 161 is extracted from the manuscript image 160. For example, an area surrounding the overlapping pixels of the issuing source information 165 of the document and the image area 161 is extracted as the overlapping area 166. The overlapping area 166 has an identical height H3 as the issuing source information 165 of the document. Subsequently, a height H13 of a partial area 166*a* and a height H14 of a partial area 166*b*, which are obtained by performing division on the overlapping area 166 in the horizontal direction in the drawing according to the reduction rate of the manuscript image indicated by the additional image information, are calculated. The partial area 166*a* is an example of the first partial area according to the exemplary embodiment of the invention. The partial area 166*b* is an example of the second partial area according to the exemplary embodiment of the invention.

The height H13 is represented by the following Equation (5).

[Equation 5]

$$\text{height } H13 = \text{height } H3 \times \text{reduction rate of manuscript image} \quad (5)$$

For example, in a case where the height H3 is 4 cm and the reduction rate of the manuscript image is 0.5, the height H13 is 4 cm×0.5=2 cm.

The height H14 is represented by the following Equation (6).

[Equation 6]

$$\text{height } H14 = \text{height } H3 \times (1 - \text{reduction rate of manuscript image}) \quad (6)$$

For example, in a case where the height H3 is 4 cm and the reduction rate of the manuscript image is 0.5, the height H14 is 4 cm×(1−0.5)=2 cm.

Subsequently, a reduction ratio R3 of the issuing source information 165 of the document is calculated so that a size of the issuing source information 165 of the reduced document becomes a size excluding the partial area 166*a*. For example, the reduction ratio R3 of the issuing source information 165 of the document is represented by the following Equation (7).

[Equation 7]

$$\text{reduction ratio } R3 = (\text{height } H3 - \text{height } H13)/\text{height } H3 \quad (7)$$

For example, in a case where the height H3 is 4 cm and the height H13 is 2 cm, the reduction ratio R3 is (4-2)/4=0.5.

In addition, a reduction ratio R4 of the image area 161 is calculated so that the size of the reduced image area 161 becomes a size excluding the partial area 164*b* illustrated in FIG. 8 and the partial area 166*b* shown in FIG. 10. For example, the reduction ratio R4 of the image area 161 is represented by the following Equation (8).

[Equation 8]

$$\text{reduction ratio } R4 = \{\text{height } H1 - (\text{height } H12 + \text{height } H14)\}/\text{height } H1 \quad (8)$$

For example, in a case where the height H1 is 100 cm, the height H12 is 1 cm, and the height H14 is 2 cm, the reduction ratio R4 is {100−(1+2)}/100=0.97.

In step S25, the processor 111 compares the reduction ratio of the manuscript image and the reduction ratio of the additional image, which are calculated in step S24, with the thresholds set in step S23, respectively. Ina case where both the reduction ratio of the manuscript image and the reduction ratio of the additional image are equal to or larger than the thresholds, the processor 111 proceeds to step S26.

In step S26, the processor 111 reduces the image area 161 of the manuscript image and the additional image according to the reduction ratio calculated in step S24. At this time, the image sizes of the manuscript image and the additional image may be simply changed according to the reduction ratio, or the manuscript image and the additional image, in which the font size of the text is changed according to the reduction ratio, may be generated. In a case where the image area 161 is reduced, the blank area 162 is enlarged to the extent that the image area 161 is reduced. That is, reduction in the image area 161 of the manuscript image indicates enlargement of the blank area 162.

In the examples illustrated in FIGS. 7 and 8, in a case where the reduction ratio R1 of the image area 161 is 0.99, the height and width of the image area 161 are reduced to 99%. In addition, in a case where the reduction ratio R2 of the CUI mark 163 is 0.5, the height and width of the CUI mark 163 are reduced to 50%. In the examples illustrated in FIGS. 9 and 10, in a case where the reduction ratio R3 of the issuing source information 165 of the document is 0.5, the height and width of the issuing source information 165 of the document are reduced to 50%. In a case where the reduction ratio R4 of the image area 161 is 0.97, the height and width of the image area 161 are reduced to 97%. Note that, since both the reduction ratios R1 and R4 of the image area 161 are equal to or larger than the threshold, the font size of text included in the reduced image area 161 is equal to or larger than 8 points of the reference. Similarly, since both the reduction ratio R2 of the CUI mark 163 and the reduction ratio R3 of the issuing source information 165 of the document are equal to or larger than the threshold, the font size of text included in the reduced CUI mark 163 or the issuing source information 165 of the document is equal to or larger than 8 points of the reference.

Figure 11:
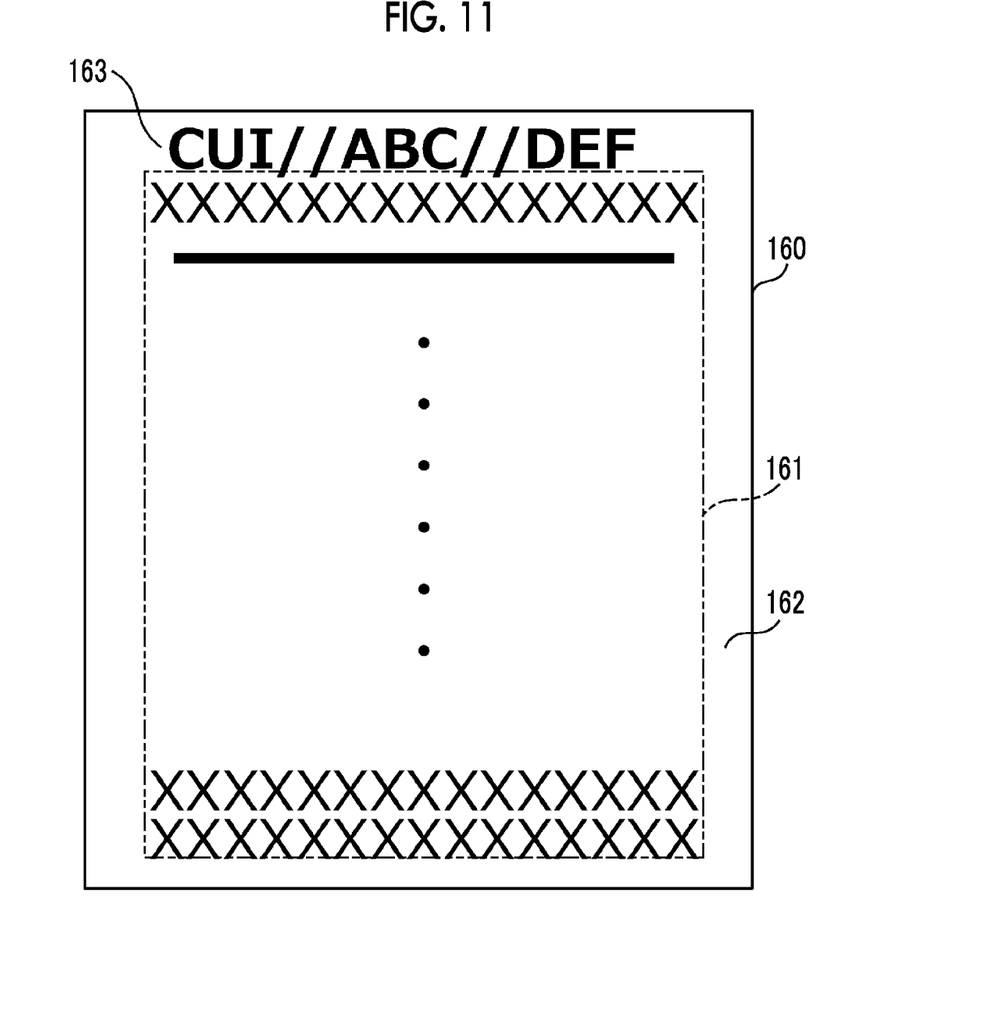
FIG. 11 is a diagram illustrating an example of a manuscript image 160 to which a CUI mark 163 is added.
Figure 12:
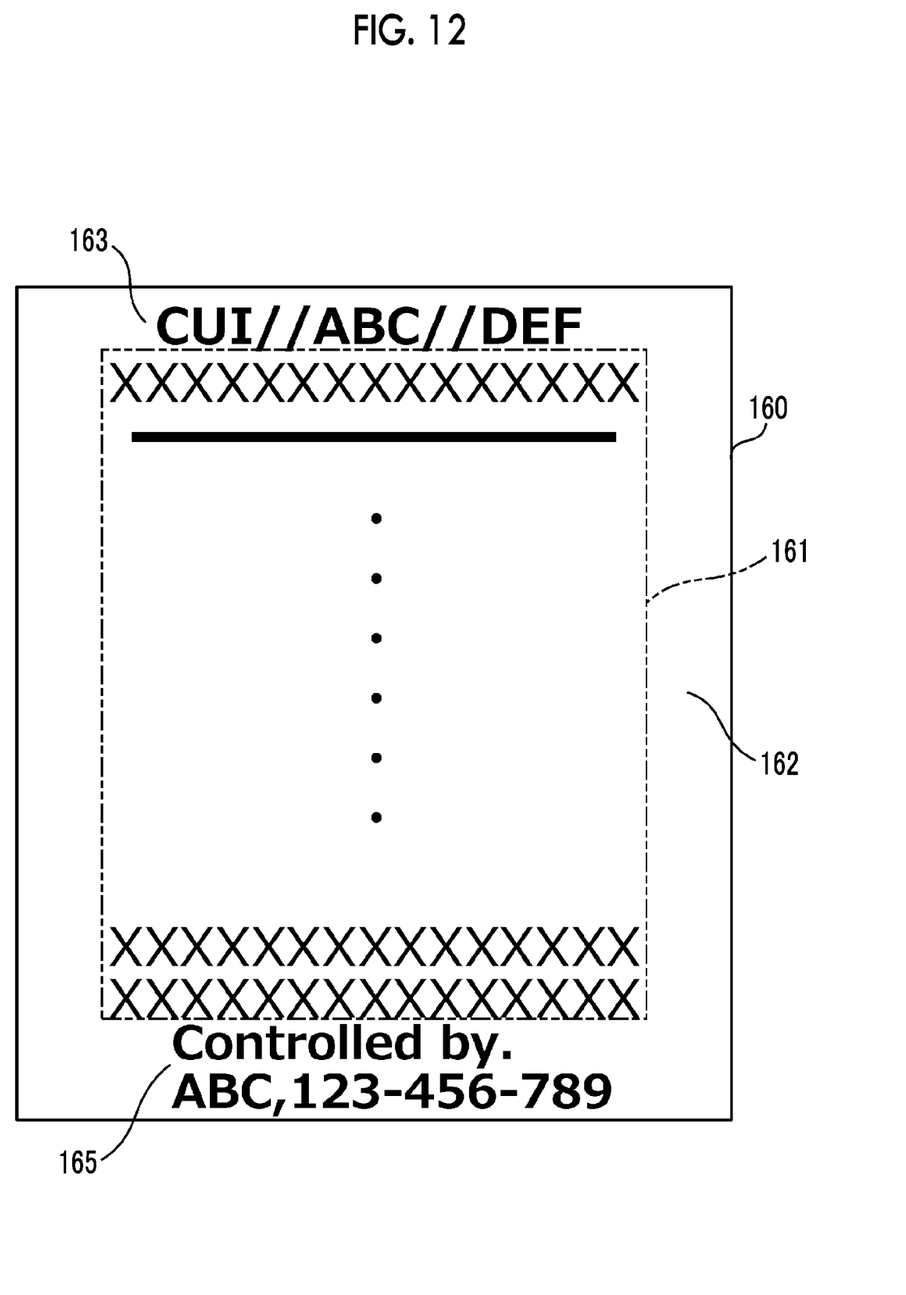
FIG. 12 is a diagram illustrating an example of the manuscript image 160 to which the CUI mark 163 and issuing source information 165 of the document are added.

In step S27, the processor 111 adds the reduced additional image to a position set on the reduced manuscript image. The addition of the additional image may be performed by combining the additional image with the manuscript image or by simply disposing the additional image on the manuscript image. FIG. 11 is a diagram illustrating an example of the manuscript image 160 to which the CUI mark 163 is added in the examples illustrated in FIGS. 7 and 8. In the example illustrated in FIG. 11, the reduced CUI mark 163 is added to the upper center of the manuscript image 160 in which the image area 161 is reduced. At this time, as illustrated in FIG. 11, the blank area 162 is enlarged along with the reduction of the image area 161. On the contrary, since the CUI mark 163 is reduced, the CUI mark 163 fits in the blank area 162. As a result, the CUI mark 163 does not overlap the image area 161. FIG. 12 is a diagram illustrating an example of the manuscript image 160 to which the CUI mark 163 and the issuing source information 165 of the document are added in the examples illustrated in FIGS. 9 and 10. In the example illustrated in FIG. 12, the reduced CUI mark 163 is added to the upper center of the manuscript image 160, in which the image area 161 is reduced, and the reduced issuing source information 165 of the document is added to the lower center. At this time, as illustrated in FIG. 12, the blank area 162 is enlarged along with the reduction of the image area 161. On the contrary, since the CUI mark 163 and the issuing source information 165 of the document are reduced, both the CUI mark 163 and the issuing source information 165 fits in the blank area 162. As a result, none of the CUI mark 163 and the image area 161, and the issuing source information 165 of the document and the image area 161 overlaps.

On the other hand, in step S25 described above, in a case where any one of the reduction ratio of the manuscript image or the reduction ratio of the additional image is less than the threshold, the processor 111 proceeds to step S28. In step S28, the processor 111 changes the reduction ratio of the manuscript image and the reduction ratio of the additional image so that the reduction ratio of the manuscript image and the reduction ratio of the additional image are equal to or larger than the thresholds. Here, it is assumed that the threshold of the reduction ratio of the manuscript image is 80% and the threshold of the reduction ratio of the additional image is 45%. In a case where the reduction ratio of the manuscript image is equal to or larger than 80% but the reduction ratio of the additional image is less than 45%, the reduction ratio of the additional image is changed to 45%. Accordingly, the reduction ratio of the manuscript image is calculated by the method similar to that in step S24 described above so that the image area of the manuscript image does not overlap the additional image reduced according to the changed reduction ratio, and the reduction ratio of the manuscript image is changed to the calculated reduction ratio. After step S28, the processor 111 returns to step S25 described above. In this case, in a case where it is determined that both the reduction ratio of the changed manuscript image and the reduction ratio of the additional image are equal to or larger than the threshold in step S25, the image area of the manuscript image and the additional image are reduced according to the changed reduction ratio.

In step S25 described above, in a case where both the reduction ratio of the manuscript image and the reduction ratio of the additional image are less than the threshold, the processor 111 proceeds to step S29. In addition, in a case where neither the reduction ratio of the changed manuscript image nor the reduction ratio of the additional image is equal to or larger than the threshold after the reduction ratio is changed in step S28 described above, the processor 111 proceeds to step S29. In step S29, the processor 111 outputs a warning. For example, a warning message indicating that an additional image cannot be added to the manuscript image is displayed on the display unit 115. Alternatively, history information indicating that the additional image is not added to the manuscript image may be stored in the memory 112. After step S29, the processor 111 skips steps S26 and S27 and proceeds to the next step. That is, in this case, no additional image is added.

In a case where the additional image adding process ends, the processor 111 proceeds to step S15 illustrated in FIG. 5. In step S15, the processor 111 determines whether a target of the additional image adding process is a final page. In a case where the target of the additional image adding process is not the final page (determination in step S15 is NO), the processor 111 moves to a next page in step S16, and repeats the process from step S14. As a result, the additional image is added to each of the plurality of pages. On the other hand, in a case where the target of the additional image adding process is the final page (determination in step S15 is YES), the processor 111 proceeds to step S17. In step S17, the processor 111 transmits image data indicating the manuscript image, to which the additional image is added, to the external apparatus 120.

According to the above-described exemplary embodiment, the manuscript image and the additional image are reduced so that the image area of the manuscript image does not overlap the additional image, and thus it is possible to add the additional image so as not to overlap the image area of the manuscript image even in a case where the manuscript image does not include a sufficient blank area for adding the additional image. Therefore, visibility of the manuscript image and the additional image is improved. In addition, in a case where a text recognition process is performed on the manuscript image to which the additional image is added, accuracy of text recognition is also improved. Further, in a case where any one of the reduction ratio of the manuscript image and the reduction ratio of the additional image is less than the threshold, the reduction ratio is changed to be equal to or larger than the threshold, and thus it is possible to prevent the image area or the additional image from being too small. Furthermore, since the threshold is set according to the reduction ratio, at which the font size of the text included in the reduced manuscript image or the additional image is equal to or larger than the font size of the reference, it is possible to prevent the text included in the manuscript image or the additional image from getting difficult to read. Furthermore, since both the image area of the manuscript image and the additional image are reduced, it is possible to prevent the image area from being reduced, compared to a case where only the image area is reduced.

3. Modified Example

The exemplary embodiment described above is an example of the present invention. The present invention is not limited to the above exemplary embodiment. In addition, the above-described exemplary embodiment may be modified and executed as in the following examples. At this time, the following two or more modified examples may be used in combination.

In the above-described exemplary embodiment, in a case where the manuscript image includes a plurality of pages, the reduction ratio of the manuscript image and the reduction ratio of the additional image are calculated for each page in order to give priority to accuracy of the additional image adding process. However, a method for calculating the reduction ratio of the manuscript image and the reduction ratio of the additional image in a case where the manuscript image includes the plurality of pages is not limited to the method. For example, in order to give priority to a speed of the additional image adding process, the processor 111 may calculate the reduction ratio of the image and the reduction ratio of the additional image for only one page included in the manuscript image, and may apply the reduction ratios to all pages. In this case, since the reduction ratio of the manuscript image and the reduction ratio of the additional image may not be calculated for other pages, a time required for the additional image adding process is shortened to the extent that the reduction ratios are not calculated. The one page is, for example, the first page. In this case, for other pages, the image area of the manuscript image and the additional image are reduced according to the reduction ratio of the manuscript image and the reduction ratio of the additional image calculated for one page. For example, in a case where the reduction ratio of the manuscript image and the reduction ratio of the additional image calculated for the first page are 0.99 and 0.5, respectively, the image area of the manuscript image is reduced to 99% and the additional image is reduced to 50% for all pages. According to the modified example, in a case where the manuscript image includes the plurality of pages, it is possible to reduce the time required for a process for reducing the manuscript image.

In addition, in order to optimize the addition of the additional image for all pages, the processor 111 may calculate the reduction ratio of the manuscript image and the reduction ratio of the additional image for each page, and may apply the smallest reduction ratio of the manuscript image and a relevant reduction ratio of the additional image to all pages. For example, in a case where the manuscript image includes three pages, the reduction ratio of the manuscript image and the reduction ratio of the additional image, which are calculated for a first page, are 0.99 and 0.5, respectively, the reduction ratio of the manuscript image and the reduction ratio of the additional image, which are calculated for a second page, are 0.98 and 0.6, respectively, and the reduction ratio of the manuscript image and the reduction ratio of the additional image, which are calculated for a third page, are 0.97 and 0.7, respectively, the reduction ratio of the manuscript image of the third page is the smallest, and thus the image area of the manuscript image is reduced to 97% and the additional image is reduced to 70% for all pages. According to the modified example, since the identical reduction ratio is applied to all pages, the sizes of texts included in the manuscript image and the additional image are not changed and are easy to view through all pages.

In the above-described exemplary embodiment, the additional image may not be necessarily reduced. For example, in a case where the reduction mode "additional image priority" is selected on the detailed setting screen 155 illustrated in FIG. 4, only the manuscript image is reduced, and the additional image may not be reduced. In addition, in a case where the font size of the text is designated for the additional image, only the manuscript image is reduced, and the additional image may not be reduced. The font size of the text of the additional image may be designated according to the manipulation of the user, or may be designated by attribute information of the additional image. In this case, the reduction ratio is calculated so that the additional image fits in the blank area of the manuscript image, and the image area of the manuscript image is reduced according to the reduction ratio. For example, in the examples illustrated in FIGS. 7 and 8, the reduction ratio of the image area 161 is calculated so that the size of the reduced image area 161 becomes a size excluding the overlapping area 164. Specifically, the reduction ratio of the image area 161 is calculated using Equations (2) and (3) described above while the reduction rate of the manuscript image is set to 0. For example, in a case where the height H1 is 100 cm and the height H2 is 2 cm, the reduction ratio of the image area 161 is (100−2)/100=0.98.

In the above-described exemplary embodiment, the processor 111 may change the reduction rate of the manuscript image according to the number of texts of the additional image, the number of texts of the manuscript image, or types of elements configuring the manuscript image. For example, in a case where the number of texts of the additional image is equal to or larger than the threshold and the additional image becomes small, it is difficult to read the texts. Therefore, the reduction rate of the manuscript image may be changed to 0.2 which is smaller than 0.5 so that the additional image does not become too small. In this case, the reduction rate of the additional image is (1−0.2)=0.8. On the contrary, in a case where the number of texts of the manuscript image is equal to or larger than the threshold and the manuscript image becomes too small, it is difficult to read the texts. Therefore, the reduction rate of the manuscript image may be changed to 0.8 which is larger than 0.5 so that the manuscript image does not become too small. In this case, the reduction rate of the additional image is (1−0.8)=0.2. In addition, in a case where the types of elements configuring the manuscript image are figures and photographs for the most part, the content can be recognized even in a case where the manuscript image becomes small. Therefore, the reduction rate of the manuscript image may be changed to 0.2 which is smaller than 0.5 so that the manuscript image becomes small. In this case, the reduction rate of the additional image is (1−0.2)=0.8. On the other hand, in a case where the types of elements configuring the manuscript image are text for the most part, it is difficult to read the manuscript image in a case where the manuscript image becomes small. Therefore, the reduction rate of the manuscript image may be changed to 0.8 which is larger than 0.5 so that the manuscript image does not become too small. In this case, the reduction rate of the additional image is (1−0.8)=0.2. In this case, for example, an image area separating process may be performed on the manuscript image before calculating the reduction ratio, a text area, a graphic area, or a photographic area may be separated from the manuscript image, and the types of the elements configuring the manuscript image may be determined according to sizes of the areas. According to this modified example, it is possible to reduce the image area and the additional image at the reduction ratio according to the number of texts of the additional image, the number of texts of the manuscript image, or the types of the elements configuring the manuscript image.

In the above-described exemplary embodiment, the additional image may be added even in a case where both the reduction ratio of the manuscript image and the reduction ratio of the additional image are less than the threshold. However, in this case, since the image area of the manuscript image overlaps the additional image, the warning indicating that the image area of the manuscript image overlaps the additional image may be output. Alternatively, in a case where both the reduction ratio of the manuscript image and the reduction ratio of the additional image are less than the threshold, a screen for inquiring whether or not to add the additional image may be displayed on the display unit 115 after the user is warned that the image area of the manuscript image overlaps the additional image, and the additional image may be added in a case where the user performs a manipulation of instructing to add the additional image.

In the embodiments above, the term "processor" refers to hardware in a broad sense. Examples of the processor include general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The present invention may be provided as a program executed in the image processing apparatus 110. The image processing apparatus 110 is an example of a computer according to the exemplary embodiment of the invention. This program may be downloaded via a communication line such as the Internet, or may be provided in a state of being recorded in a computer-readable recording medium such as a magnetic recording medium (a magnetic tape, a magnetic disk, or the like), an optical recording medium (an optical disk or the like), a magneto-optical recording medium, or a semiconductor memory.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to
acquire a manuscript image and an additional image added to the manuscript image, and
reduce an image area other than a blank area in the manuscript image so that the additional image fits in the blank area of the manuscript image.

2. An information processing apparatus comprising:
a processor configured to
acquire a manuscript image and an additional image added to the manuscript image, and
enlarge a blank area other than an image area in the manuscript image so that the additional image fits in the blank area of the manuscript image.

3. The information processing apparatus according to claim 1, wherein the processor is configured to
in a case where a ratio of a reduced size to an unreduced size of the image area is less than a threshold, change the ratio to be equal to or larger than the threshold, and
reduce the image area or enlarge the blank area according to the changed ratio.

4. The information processing apparatus according to claim 2, wherein the processor is configured to
in a case where a ratio of a reduced size to an unreduced size of the image area is less than a threshold, change the ratio to be equal to or larger than the threshold, and
reduce the image area or enlarge the blank area according to the changed ratio.

5. The information processing apparatus according to claim 3, wherein the threshold is set according to the ratio in which a size of a text included in the reduced image area is equal to or larger than a predetermined size.

6. The information processing apparatus according to claim 4,
wherein the threshold is set according to the ratio in which a size of a text included in the reduced image area is equal to or larger than a predetermined size.

7. The information processing apparatus according to claim 1,
wherein the processor is configured to reduce the image area and the additional image so that the additional image fits in the blank area.

8. The information processing apparatus according to claim 2,
wherein the processor is configured to reduce the image area and the additional image so that the additional image fits in the blank area.

9. The information processing apparatus according to claim 7, wherein the processor is configured to
in a case where a ratio of a reduced size to an unreduced size of the additional image is less than a threshold, change the ratio to be equal to or larger than the threshold, and
reduce the additional image according to the changed ratio.

10. The information processing apparatus according to claim 8, wherein the processor is configured to
in a case where a ratio of a reduced size to an unreduced size of the additional image is less than a threshold, change the ratio to be equal to or larger than the threshold, and
reduce the additional image according to the changed ratio.

11. The information processing apparatus according to claim 9,
wherein the threshold is set according to the ratio in which a size of a text included in the reduced additional image is equal to or larger than a predetermined size.

12. The information processing apparatus according to claim 10,
wherein the threshold is set according to the ratio in which a size of a text included in the reduced additional image is equal to or larger than a predetermined size.

13. The information processing apparatus according to claim 7, wherein the processor is configured to
extract an overlapping area between the image area of the acquired manuscript image and the acquired additional image,
reduce the additional image so that a size of the reduced additional image becomes a size excluding a first partial area included in the overlapping area, and
reduce the image area or enlarge the blank area so that the size of the reduced image area becomes a size excluding a second partial area other than the first partial area included in the overlapping area.

14. The information processing apparatus according to claim 8, wherein the processor is configured to
extract an overlapping area between the image area of the acquired manuscript image and the acquired additional image,
reduce the additional image so that a size of the reduced additional image becomes a size excluding a first partial area included in the overlapping area, and
reduce the image area or enlarge the blank area so that the size of the reduced image area becomes a size excluding a second partial area other than the first partial area included in the overlapping area.

15. The information processing apparatus according to claim 13,
wherein the processor is configured to change a ratio of the first partial area to the second partial area according to the number of texts of the additional image, the number of texts of the manuscript image, or a type of an element configuring the manuscript image.

16. The information processing apparatus according to claim 14,
wherein the processor is configured to change a ratio of the first partial area to the second partial area according to the number of texts of the additional image, the number of texts of the manuscript image, or a type of an element configuring the manuscript image.

17. The information processing apparatus according to claim 1,
wherein the manuscript image includes a plurality of pages,
wherein the additional image is added to each of the plurality of pages, and
wherein the processor is configured to reduce the image area of each of the plurality of pages or enlarge the blank area according to a ratio of a reduced size to an unreduced size of the image area determined for one page of the plurality of pages.

18. The information processing apparatus according to claim 2,
wherein the manuscript image includes a plurality of pages,
wherein the additional image is added to each of the plurality of pages, and
wherein the processor is configured to reduce the image area of each of the plurality of pages or enlarge the blank area according to a ratio of a reduced size to an unreduced size of the image area determined for one page of the plurality of pages.

19. The information processing apparatus according to claim 1,
wherein the processor is configured to add the additional image to the blank area of the manuscript image in a state in which the image area is reduced or the blank area is enlarged.

20. A non-transitory computer readable medium storing a program causing a computer to execute a process, the process comprising:
    acquiring a manuscript image and an additional image added to the manuscript image; and
    reducing an image area other than a blank area in the manuscript image so that the additional image fits in the blank area of the manuscript image.

\* \* \* \* \*